United States Patent
Parvataneni et al.

(10) Patent No.: US 11,469,954 B2
(45) Date of Patent: Oct. 11, 2022

(54) SYSTEM AND METHODS FOR SERVICE POLICY OPTIMIZATION FOR MULTI-ACCESS EDGE COMPUTING SERVICES

(71) Applicant: Verizon Patent and Licensing Inc., Arlington, VA (US)

(72) Inventors: Raghuram Parvataneni, Edison, NJ (US); Kirk Campbell, Long Valley, NJ (US); Ravi Sharma, Freehold, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/414,441

(22) Filed: May 16, 2019

(65) Prior Publication Data

US 2020/0366559 A1    Nov. 19, 2020

(51) Int. Cl.
| | |
|---|---|
| *H04L 12/24* | (2006.01) |
| *H04L 12/26* | (2006.01) |
| *H04L 41/0893* | (2022.01) |
| *H04L 41/16* | (2022.01) |
| *H04L 41/5025* | (2022.01) |
| *H04L 41/14* | (2022.01) |
| *H04L 43/0852* | (2022.01) |

(52) U.S. Cl.
CPC ........ *H04L 41/0893* (2013.01); *H04L 41/145* (2013.01); *H04L 41/16* (2013.01); *H04L 41/5025* (2013.01); *H04L 43/0852* (2013.01)

(58) Field of Classification Search
CPC ........................... H04L 12/1407; H04M 15/66
See application file for complete search history.

(56) References Cited

U.S. PATENT DOCUMENTS

| | | | | |
|---|---|---|---|---|
| 2017/0195896 | A1* | 7/2017 | Lee | ...................... H04L 41/0813 |
| 2018/0262594 | A1* | 9/2018 | Nhu | ........................ H04L 41/12 |
| 2018/0324636 | A1* | 11/2018 | Laha | ................... H04L 41/0686 |
| 2019/0230484 | A1* | 7/2019 | Rasanen | ............. H04L 12/1407 |
| 2019/0289058 | A1* | 9/2019 | Bhoj | ..................... H04L 67/025 |
| 2020/0366733 | A1* | 11/2020 | Parvataneni | ........ H04L 43/0817 |

* cited by examiner

*Primary Examiner* — William G Trost, IV
*Assistant Examiner* — Christopher P Cadorna

(57) ABSTRACT

Systems and methods provide a MEC policy optimization service. A network device applies, in a first edge cluster of the application service layer network, a policy for an application service that supports a customer application; receives network performance data related to execution of the application service; identifies, based on the network performance data, an improved policy to optimize the first policy for the customer application in the first edge cluster; and sends a model of the improved policy to a central network device for the application service layer network.

20 Claims, 8 Drawing Sheets

SYSTEM AND METHODS FOR SERVICE POLICY OPTIMIZATION FOR MULTI-ACCESS EDGE COMPUTING SERVICES

BACKGROUND

One enhancement made possible through new broadband cellular networks is the use of Multi-access Edge Computing (MEC) platforms (also referred to as Mobile Edge Computing platforms). The MEC platforms allow high network computing loads to be transferred onto edge servers. Depending on the location of the edge servers relative to the point of attachment (e.g., a wireless station for a user device), MEC platforms can provide various services and applications to user devices with minimal latency.

Customer applications may be configured with a subscription to MEC services to provide an optimal user experience for the customer application. Application developers provide policy input for their applications that may use MEC services, defining parameters such as minimum latency requirement and minimum number of service instances for their application.

DETAILED DESCRIPTION OF PREFERRED EMBODIMENTS

Figure 1:
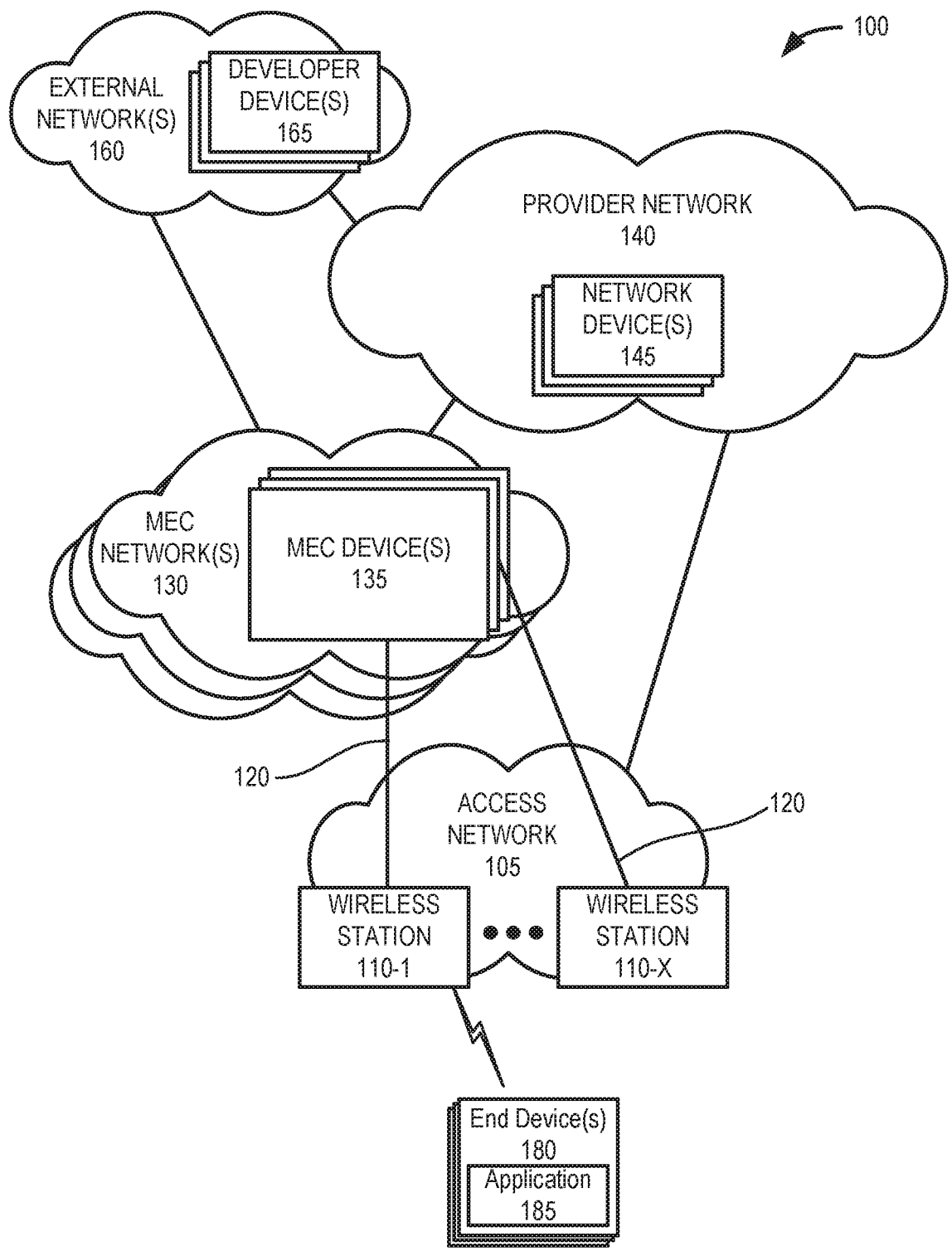
FIG. 1 is a diagram illustrating an exemplary network environment in which a MEC policy optimization service described herein may be implemented.

The following detailed description refers to the accompanying drawings. The same reference numbers in different drawings may identify the same or similar elements. Also, the following detailed description does not limit the invention.

Customer applications (or "apps") running on user devices can take advantage of MEC compute resources to provide enhanced services. For example, an app may offload compute tasks to a MEC platform that can provide services faster than other cloud-based services or a local user device processor. Typically, the app user or the app provider will incur these offload compute costs, and analytics may be gathered by multiple parties, including the developer, the MEC provider, the access network provider, etc.

A MEC network may be configured to maintain a minimum number of virtual network devices and/or service application instances in support of any given customer application. For each new customer application or version, application developers may provide input for policies that impact the MEC network configuration, such as minimum latency requirements, a minimum number of service instances to support the customer application, required throughput, an amount of reserved/dedicated memory, etc. These developer inputs direct the types and amounts of MEC compute resource that may be reserved by a MEC service provider for a particular service. In many cases when providing these developer inputs, the application developer over-subscribes or under-subscribes for resources and/or latency. As a result, the application developer incurs higher service costs than are actually needed, and the MEC service provider incurs unnecessary resource constraints.

Systems and methods described herein provide a MEC policy optimization service to identify improved MEC services policies. A machine-learning module may analyze a policy for each customer application. The machine-learning module may observe various internal and external system data related to the customer application, such as load balancing, latency, performance monitoring, etc., and automatically generate appropriate policy suggestions for the developer based on the developer's budget and performance requirements for the customer application. The application developer may use the policy suggestions to select cost-effective policy settings for the application, while optimizing resource allocations for the MEC service provider.

According to one embodiment, a network device applies, in a first edge cluster of the application service layer network, a policy for an application service that supports a customer application; receives network performance data related to execution of the application service; identifies, based on the network performance data, an improved policy to optimize the first policy for the customer application in the first edge cluster; and sends a model of the improved policy to a central network device for the application service layer network.

According to another embodiment, the central network device receives the model of the improved policy and receives another model of another improved policy to optimize the first policy for the customer application in a second edge cluster of the application service layer network. The central network device generates a second policy for the customer application based on the model and the other model.

FIG. 1 illustrates an exemplary environment 100 in which an embodiment of the token-based MEC resource service may be implemented. As illustrated, environment 100 includes an access network 105, one or more MEC networks 130, a provider network 140, and one or more external network 160. Access network 105 may include wireless stations 110-1 through 110-X (referred to collectively as wireless stations 110 and generally as wireless station 110). MEC network 130 may include MEC devices 135; provider network 140 may include network devices 145; and external network 160 may include developer devices 165. Environment 100 further includes one or more user devices 180.

The number, the type, and the arrangement of network device and the number of user devices 180 illustrated in FIG. 1 are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between user devices 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) radio access network (RAN), Fourth Generation (4G) RAN, and/or another type of future generation RAN. By way of further example, access network 105 may be implemented to include an Evolved UMTS Terrestrial Radio Access Network (E-UTRAN) of a Long Term Evolution (LTE) network, an LTE-Advanced (LTE-A) network, and/or an LTE-A Pro network, a next generation (NG) RAN, and/or another type of RAN (e.g., a legacy RAN). Access network 105 may further include other types of wireless networks, such as a WiFi network, a Worldwide Interoperability for Microwave Access (WiMAX) network, a local area network (LAN), or another type of network that may provide an on-ramp to wireless stations 110 and/or provider network 140.

Depending on the implementation, access network 105 may include one or multiple types of wireless stations 110. For example, wireless station 110 may include a next generation Node B (gNB), an evolved Node B (eNB), an evolved Long Term Evolution (eLTE) eNB, a radio network controller (RNC), a remote radio head (RRH), a baseband unit (BBU), a small cell node (e.g., a picocell device, a femtocell device, a microcell device, a home eNB, a repeater, etc.), or another type of wireless node. Wireless stations 110 may connect to MEC network 130 via backhaul links 120. According to various embodiments, access network 105 may be implemented according to various wireless technologies (e.g., radio access technology (RAT), etc.), wireless standards, wireless frequencies/bands, and so forth.

MEC network 130 may include an end device application or service layer network (also referred to as an "application service layer network"). According to an implementation, MEC network 130 includes a platform that provides application services at the edge of a network. For purposes of illustration and description, MEC devices 135 may include the various types of network devices that may be resident in MEC network 130. MEC devices 135 may be located to provide geographic proximity to various groups of wireless stations 110. Some MEC devices 135 may be co-located with network devices 145 of provider network 140.

MEC network 130 may be implemented using one or multiple technologies including, for example, network function virtualization (NFV), software defined networking (SDN), cloud computing, or another type of network technology. Depending on the implementation, MEC network 130 may include, for example, virtualized network functions (VNFs), multi-access (MA) applications/services, and/or servers. MEC network 130 may also include other network devices that support its operation, such as, for example, a network function virtualization orchestrator (NFVO), a virtualized infrastructure manager (VIM), an operations support system (OSS), a local domain name server (DNS), a virtual network function manager (VNFM), and/or other types of network devices and/or network resources (e.g., storage devices, communication links, etc.). MEC network 130 is described further, for example, in connection with FIG. 2.

Provider network 140 may include one or multiple networks of one or multiple network types and technologies to support access network 105. For example, provider network 140 may be implemented to include a next generation core (NGC) network for a 5G network, an Evolved Packet Core (EPC) of an LTE network, an LTE-A network, an LTE-A Pro network, and/or a legacy core network. Depending on the implementation, provider network 140 may include various network devices 145, such as for example, a user plane function (UPF), an access and mobility management function (AMF), a session management function (SMF), a unified data management (UDM) device, an authentication server function (AUSF), a network slice selection function (NSSF), and so forth. According to other exemplary implementations, provider network 140 may include additional, different, and/or fewer network devices than those described. For purposes of illustration and description, network devices 145 may include various types of network devices that may be resident in provider network 140, as described further, for example, in connection with FIGS. 3 and 4.

External network 160 may include one or multiple networks. For example, external network 160 may be implemented to include a service or an application-layer network, the Internet, an Internet Protocol Multimedia Subsystem (IMS) network, a Rich Communication Service (RCS) network, a cloud network, a packet-switched network, or other type of network that hosts a user device application or service. Depending on the implementation, external network 160 may include various developer devices 165 that provide various applications, services, or other type of user device assets, such as servers (e.g., web, application, cloud, etc.), mass storage devices, data center devices, and/or other types of network services pertaining to various network-related functions. According to an implementation, developer devices may use APIs to request (from provider network 140) access to MEC services. In response to receiving the request, provider network 140 may initiate creation of dedicated MEC service functions to support instances of an application (e.g., application 185).

User device 180 includes a device that has computational and wireless communication capabilities. User device 180 may be implemented as a mobile device, a portable device, a stationary device, a device operated by a user, or a device not operated by a user. For example, user device 180 may be implemented as a Mobile Broadband device, a smartphone, a computer, a tablet, a netbook, a wearable device, a vehicle support system, a game system, a drone, or some other type of wireless device. According to various exemplary embodiments, user device 180 may be configured to execute various types of software (e.g., applications, programs, etc.). User device 180 may support one or multiple RATs (e.g., 4G, 5G, etc.), one or multiple frequency bands, network slicing, dual-connectivity, and so forth. Additionally, user device 180 may include one or multiple communication interfaces that provide one or multiple (e.g., simultaneous or non-simultaneous) connections via the same or different RATs, frequency bands, etc. As described further herein, user device 180 may download and/or register application 185.

The application (or "app") may be a customer application designed to use MEC compute resources.

According to an exemplary embodiment, MEC devices 135 of MEC network 130 include logic that provides a MEC policy optimization service, as described herein. For example, the MEC policy optimization service may automatically monitor network performance data against application performance specifications (e.g., how the customer application is supposed to perform) at each edge. MEC devices 135 at each edge may identify, for example, where aspects of a MEC policy could be relaxed and still meet a customer objective for application performance. Conversely, a MEC device 135 may identify where aspects of a MEC policy are causing the customer application to underperform application performance specifications. As described further herein, MEC devices 135 at each edge may provide a policy model for the customer application to a central policy optimizer, which may generate, based on multiple models for the customer application, an optimized policy for the customer application.

Figure 2:
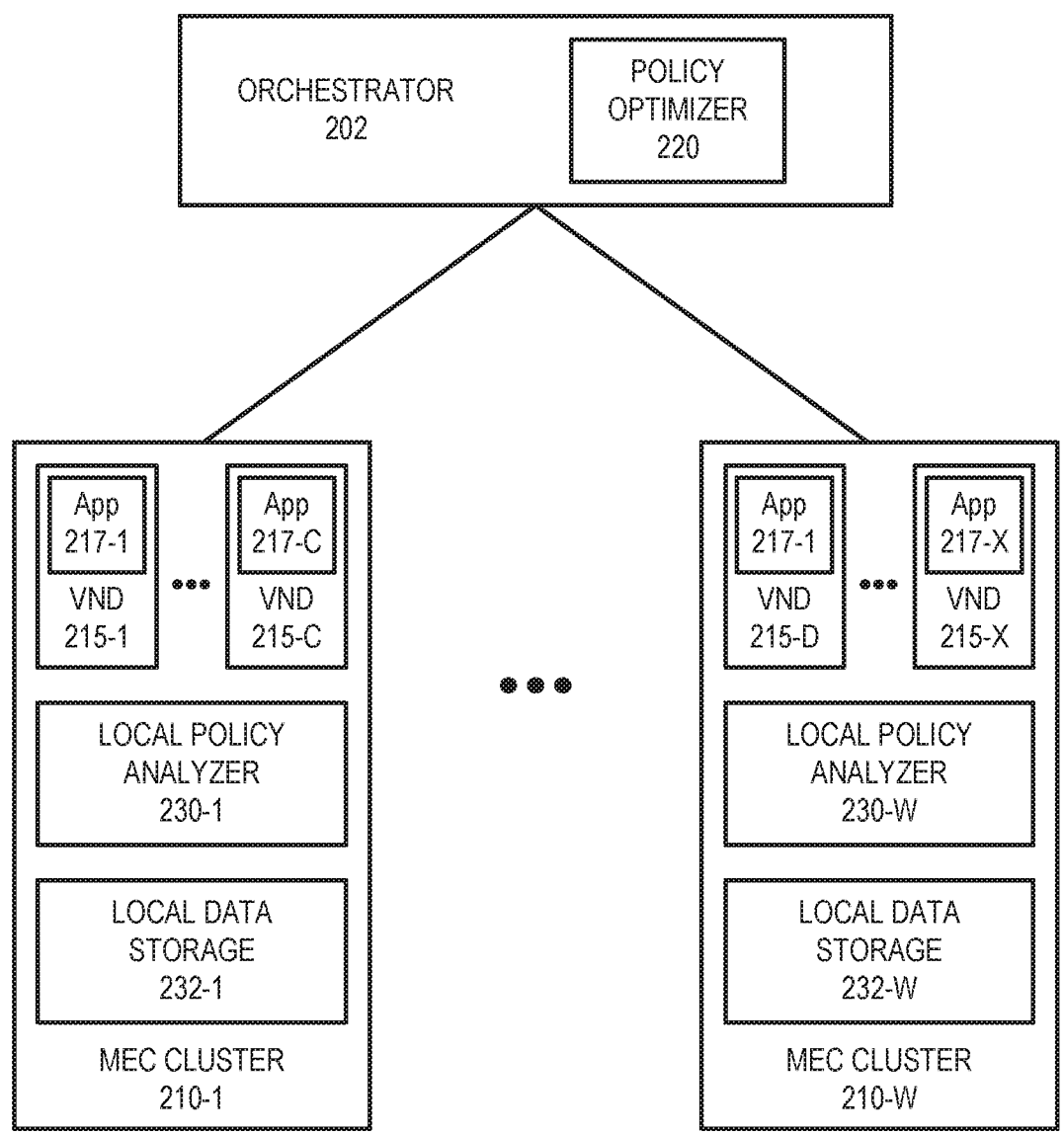
FIG. 2 is a block diagram illustrating exemplary components of the MEC network of FIG. 1.

FIG. 2 is a block diagram illustrating exemplary components of MEC network 130 that may implement the MEC policy optimization service described herein. As illustrated, MEC network 130 may include an orchestrator 202 and MEC clusters 210-1 through 210-W (also referred to as MEC clusters 210, and individually or generally as MEC cluster 210). Orchestrator 202 may include a policy optimizer 220. Each of MEC clusters 210 may include virtual network devices (VND) 215-1 through 215-X (also referred to as virtual network devices 215, and individually or generally as virtual network device 215), a local policy analyzer 230-1 through 230-W (also referred to as local policy analyzers 230, and individually or generally as local policy analyzer 230), and local data storage 232-1 through 232-W (also referred to generally as local data storage 232). VNDs 215 may include applications (App) 217-1 through 217-X (also referred to as applications 217, and individually or generally as application 217). Each of orchestrator 202, MEC clusters 210, policy optimizer 220, and local policy analyzer 230 may correspond to one or more MEC devices 135.

MEC cluster 210 may support one or multiple VNDs 215 and applications 217 that provide application services and/or microservices (e.g., a task, a function, etc.) of the application service (also referred to as an application service), as described herein. The application services may pertain to broadband services in dense areas (e.g., pervasive video, smart office, operator cloud services, video/photo sharing, etc.), broadband access everywhere (e.g., 50/100 Mbps, ultra-low-cost network, etc.), higher user mobility (e.g., high speed train, remote computing, moving hot spots, etc.), Internet of Things (IoTs) (e.g., smart wearables, sensors, mobile video surveillance, smart cities, connected home, etc.), extreme real-time communications (e.g., tactile Internet, augmented reality (AR), virtual reality (VR), etc.), lifeline communications (e.g., natural disaster, emergency response, etc.), ultra-reliable communications (e.g., automated traffic control and driving, collaborative robots, health-related services (e.g., monitoring, remote surgery, etc.), drone delivery, public safety, etc.), broadcast-like services, and/or other types of mobile edge application services.

According to an implementation, MEC clusters 210 may be located at different geographic locations (e.g., network edges) to provide minimum latency for customers using local access networks 105/wireless stations 110. Although multiple MEC clusters 210 may be located at each network edge, a single MEC cluster 210 is represented herein as a different network edge for simplicity. The number, type, and arrangement of MEC clusters 210 are exemplary. The number and arrangement of communication links illustrated are also exemplary. MEC network 130 may include additional and/or different MEC devices 135 in other exemplary embodiments. For example, MEC devices 135 may include additional and/or different system or management level MEC devices 135 that are not illustrated and described for the sake of brevity.

Orchestrator 202 may automate sequences of activities, tasks, rules, and policies needed for on-demand creation, modification, or removal of network, application, or infrastructure services and resources. Orchestrator 202 may provide orchestration at a high level, with an end-to-end view of the infrastructure, network, and applications. For example, orchestrator 202 may be a centralized component serving hundreds of edge locations (e.g., MEC clusters 210). In the configuration of FIG. 2, orchestrator 202 may include policy optimizer 220 or some logical components of policy optimizer 220.

MEC clusters 210 may include network devices that support the virtualization of application services. MEC cluster 210 provides various physical resources (e.g., processors, memory, storage, communication interface, etc.), software resources (e.g., operating system, etc.) and other virtualization elements (e.g., hypervisor, container engine, etc.). VNDs 215 may be implemented as containers, VMs, or another type of virtualization architecture that provides one or multiple application services for end devices 180. Application 217 may include software for an application service (e.g., that supports a customer application). Applications 217 may include one or multiple instances of the same or different application services.

According to an implementation, local policy analyzer 230 may be included with or provided for each MEC cluster 210. Local policy analyzer 230 may include, for example, a machine learning module configured to determine if a particular application policy (e.g., for application 185) is optimized for a local edge. Local policy analyzer 230 may use different algorithms and/or different parameters for the algorithms to make decisions, predictions, and/or inferences. According to implementations described herein, local policy analyzer 230 may obtain and store network data from access network 105, MEC network 130, provider network 140, and/or external network 160 that pertains to application 185 performance at a particular edge (e.g., MEC cluster 210). According to an implementation, local policy analyzer 230 may identify, based on the network data, an improved policy to optimize the initial policy for application 185 in relation to the local MEC cluster 210. Local policy analyzer 230 may send a model of the improved policy to policy optimizer 220 for further processing.

Local data storage 232 may store network data for use by local policy analyzer 230 to develop and improve policy models. In one implementation, local data storage 232 may receive data feeds from multiple sources. In another implementation, local data storage 232 may receive data from a source of previously compiled data. The data feeds may include (or be filtered to only include) data that pertains to a particular customer application (e.g., application 185). Local data storage 232 may store, for example, location data, RAN data, network performance data, application (e.g. application 185) performance data, security data, customer application requirements, etc.

Policy optimizer 220 may receive models of the improved policies from the local policy analyzer 230 at each MEC cluster 210. Policy optimizer 220 may generate, based on the models, an optimized policy for the customer application. As described further herein, policy optimizer 230 may store the optimized policy, locally and/or at a network device 145 in provider network 140). In one implementation, policy optimizer 220 may send to a customer a notification (e.g., a text message, email, instant message, push notification, etc.) of the optimized policy for the customer application.

Figure 3:
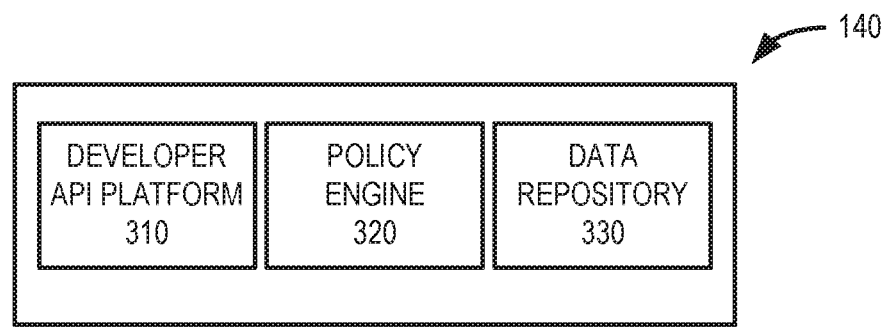
FIG. 3 is a block diagram illustrating exemplary components of the provider network of FIG. 1.

FIG. 3 is a block diagram illustrating exemplary components of provider network 140. As shown in FIG. 3, provider network 140 may include a developer API platform 310, a policy engine 320, and a data repository 330. Each of developer API platform 310, a policy engine 320, and a data repository 330 may be implemented as one or more network devices 145.

Developer API platform 310 may include a user interface, software development kit, and other tools for developers (e.g., using developer devices 165) to integrate application service calls (e.g., API calls) in to customer applications. Developer API platform 310 may also solicit developer input for policies for MEC applications services used to support customer applications (e.g., application 185). According to an implementation, developer API platform 310 may also provide an interface to notify a developer/customer of policy improvements identified by the MEC policy optimization service.

Policy engine 320 may use developer input (e.g., obtained through developer API platform 310) to generate policies for MEC applications services used to support customer applications. In one implementation, policy engine 320 may store multiple policy templates that be applied as a best-fit for a new customer application. After an initial policy is implemented for a customer application, policy engine 320 may receive optimized policies from policy optimizer 220. According to an implementation, policy engine 320 may convert optimized policies for a particular customer application into policy templates that may be used for other new customer applications.

Data repository 330 may collect network data, such as performance metrics. In one implementation, data repository 330 may include or communicate with a Network Data Analytics Function (NWDAF) of a core network in provider network 140. The NWDAF may collect analytics information associated with access network 105 and/or provider network 140. For example, the NWDAF may collect accessibility key performance indicators (KPIs, e.g., an RRC setup success rate, a RAB success rate, etc.), availability KPIs (e.g., radio network unavailability rate, etc.), traffic KPIs (e.g., downlink traffic volume, uplink traffic volume, average number of users, maximum number of users, a number of voice bearers, a number of video bearers, etc.), response time KPIs (e.g., latency, packet arrival time, etc.), retainability KPIs (e.g., a call drop rate, etc.), mobility KPIs (e.g., a handover success rate, etc.), service integrity KPIs (e.g., downlink average throughput, downlink maximum throughput, uplink average throughput, uplink maximum throughput, etc.), utilization KPIs (e.g., resource block utilization rate, average processor load, etc.), and/or other types of wireless network KPIs. Data repository 330 may provide data to a local policy analyzer 230 and/or local data storage 232 for each MEC cluster 125. In one implementation, data repository 330 may provide data to devices in MEC clusters 210 periodically, in near-real time, or as resource availability permits. In another implementation, data from data repository 330 may be provided upon request from each MEC cluster 210. Data repository 330 may be a distributed component.

Figure 4:
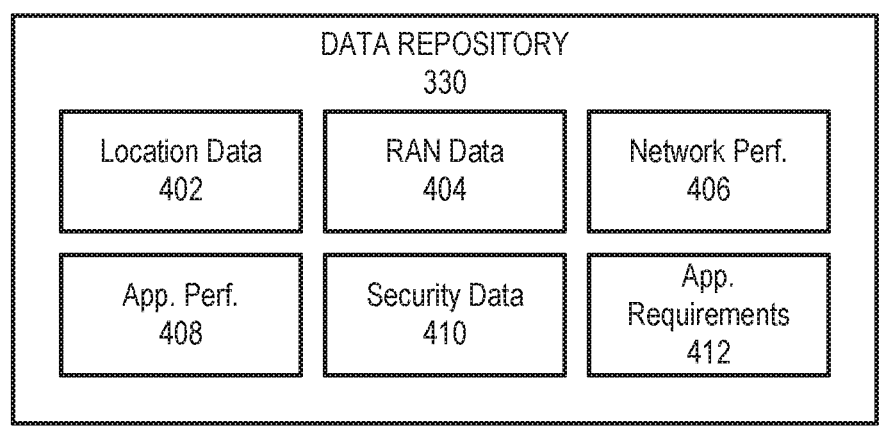
FIG. 4 is block diagram illustrating exemplary data components of the data repository of FIG. 3.

FIG. 4 is block diagram illustrating exemplary data components of data repository 330. Data repository 330 may include multiple data feeds that may be used to provide data to local data storage 232 and/or for use by local policy analyzer 230. As shown in FIG. 4, data repository 330 may include location data 402, RAN data 404, network performance data 406, application (e.g. application 185) performance data 408, security data 410, and application requirements 412.

Location data 402 may include a location of an end device 180 when accessing MEC network 130. Location data 402 may include a GPS location, a wireless station location (e.g., a location of wireless station 110 servicing end device 180), or other location information associated with end device 180 when application 185 is using services from MEC network 130. RAN data 404 may include measureable features for a radio access network (e.g., access network 105). RAN data 404 may include, for example, Context Drop Rate, Context Setup Failure Rate, Radio Resource Control (RRC) Drop Rate, RRC Failure Rate, Average Number of RRCs in Connected Mode, Physical Resource Block Utilization, Access Bearer Drop Rate, Downlink Delay, Application Layer Round Trip Time, etc.

Network performance data 406 may include tracked network performance parameters (e.g., bandwidth, throughput, latency, etc.) for MEC cluster 210, MEC network 130, provider network 140, and/or external network 160. In other implementations, network performance data 406 may include features (e.g., key performance indicators) from multiple different networks of an end-to-end connection. Application performance data 408 may include data to indicate how an application (e.g. application 185) is performing for the user. Application performance data 408 may include, for example, data that indicates how applications use available resources, typical latencies, number of packets generated, user experience ratings, etc. Security data 410 may include data from, for example, firewalls, intrusion detection devices, traffic logs, fraud analytics, etc. that may reflect on application 185 performance.

Application requirements 412 may include a performance metrics for a customer application (e.g., application 185). For example, application requirements 412 may include application performance specifications (e.g., how the customer application is supposed to perform) that are not directly tied to MEC service requirements. Comparison of application requirements 412 with other network data (e.g., from any of location data 402, RAN data 404, network performance data 406, application performance data 408, security data 410, etc.) may allow the MEC policy optimization service to identify, for example, where an MEC policy could be relaxed and still meet a customer objective for application performance. Although FIG. 4 illustrates some examples of data that may be provided to local policy analyzer 230, in other implementation, different, additional, or less data may be used.

Figure 5:
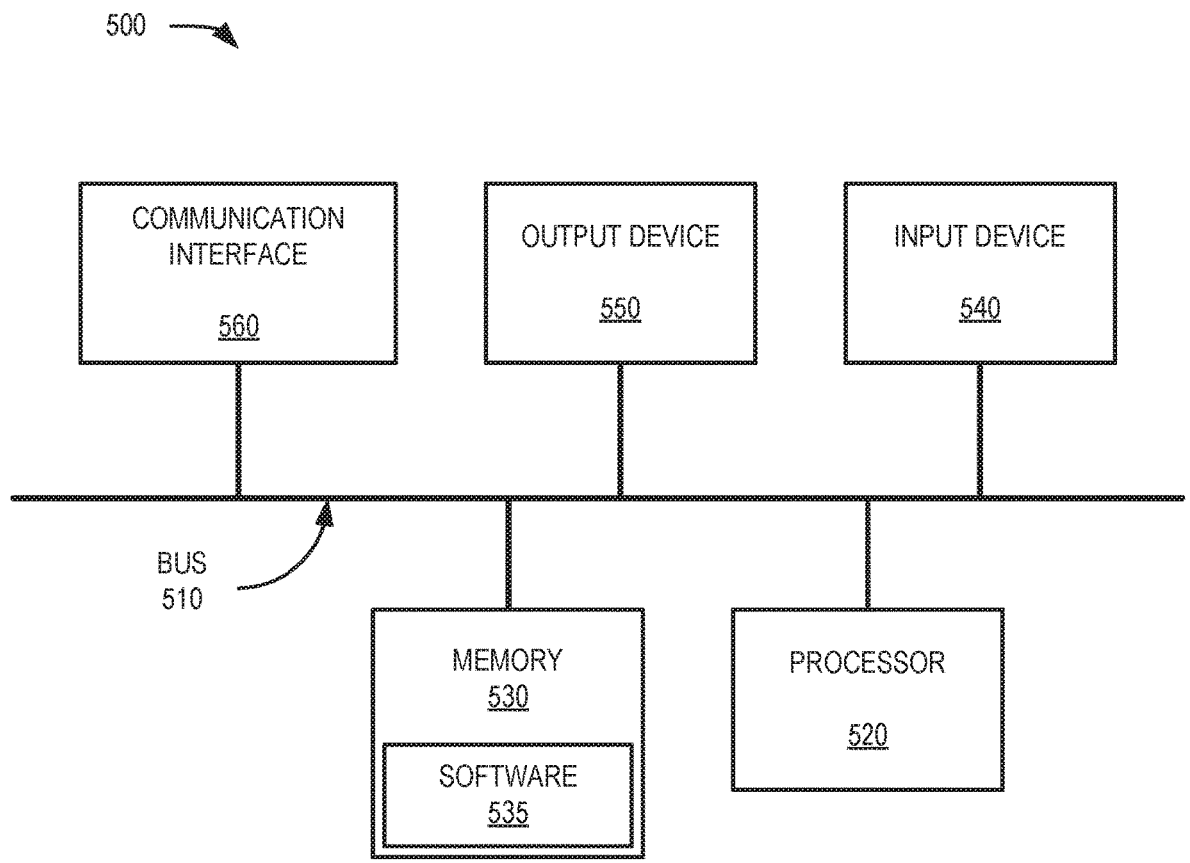
FIG. 5 is a block diagram illustrating exemplary components of a device that may correspond to one of the devices of FIG. 1.

FIG. 5 is a block diagram illustrating exemplary components of a device that may correspond to one of the devices of FIGS. 1-4. Each of MEC device 135, network device 145, developer device 165, user device 180, orchestrator 202, MEC cluster 210, policy optimizer 220, and local policy analyzer 230 may be implemented as a combination of hardware and software on one or more of device 500. As shown in FIG. 5, device 500 may include a bus 510, a processor 520, a memory 530, an input component 540, an output component 550, and a communication interface 560.

Bus 510 may include a path that permits communication among the components of device 500. Processor 520 may include a processor, a microprocessor, or processing logic that may interpret and execute instructions. Memory 530 may include any type of dynamic storage device that may store information and instructions, for execution by processor 520, and/or any type of non-volatile storage device that may store information for use by processor 520.

Software 535 includes an application or a program that provides a function and/or a process. Software 535 is also intended to include firmware, middleware, microcode, hardware description language (HDL), and/or other form of instruction. By way of example, when device 500 is a user device 180, software 535 may include application 185 that uses MEC services.

Input component 540 may include a mechanism that permits a user to input information to device 500, such as a keyboard, a keypad, a button, a switch, touch screen, etc. Output component 550 may include a mechanism that outputs information to the user, such as a display, a speaker, one or more light emitting diodes (LEDs), etc.

Communication interface 560 may include a transceiver that enables device 500 to communicate with other devices and/or systems via wireless communications, wired communications, or a combination of wireless and wired communications. For example, communication interface 560 may include mechanisms for communicating with another device or system via a network. Communication interface 560 may include an antenna assembly for transmission and/or reception of RF signals. For example, communication interface 560 may include one or more antennas to transmit and/or receive RF signals over the air. In one implementation, for example, communication interface 560 may communicate with a network and/or devices connected to a network. Alternatively or additionally, communication interface 560 may be a logical component that includes input and output ports, input and output systems, and/or other input and output components that facilitate the transmission of data to other devices.

Device 500 may perform certain operations in response to processor 520 executing software instructions (e.g., software 535) contained in a computer-readable medium, such as memory 530. A computer-readable medium may be defined as a non-transitory memory device. A non-transitory memory device may include memory space within a single physical memory device or spread across multiple physical memory devices. The software instructions may be read into memory 530 from another computer-readable medium or from another device. The software instructions contained in memory 530 may cause processor 520 to perform processes described herein. Alternatively, hardwired circuitry may be used in place of or in combination with software instructions to implement processes described herein. Thus, implementations described herein are not limited to any specific combination of hardware circuitry and software.

Device 500 may include fewer components, additional components, different components, and/or differently arranged components than those illustrated in FIG. 5. As an example, in some implementations, a display may not be included in device 500. As another example, device 500 may include one or more switch fabrics instead of, or in addition to, bus 510. Additionally, or alternatively, one or more components of device 500 may perform one or more tasks described as being performed by one or more other components of device 500.

Figure 6A:
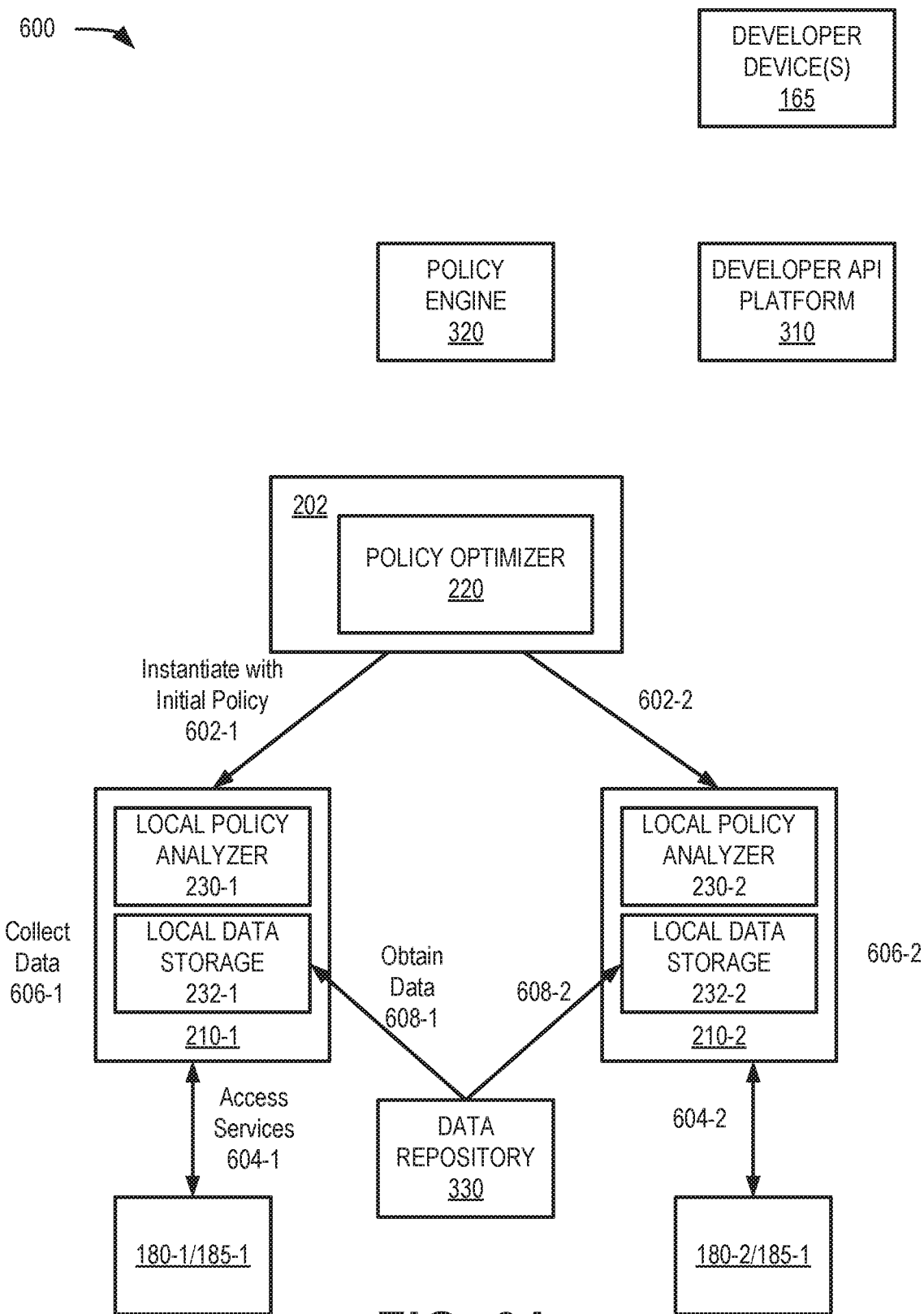
FIGS. 6A and 6B are diagrams illustrating exemplary communications for providing the MEC policy optimization service in a portion of the network environment of FIG. 1.
Figure 6B:
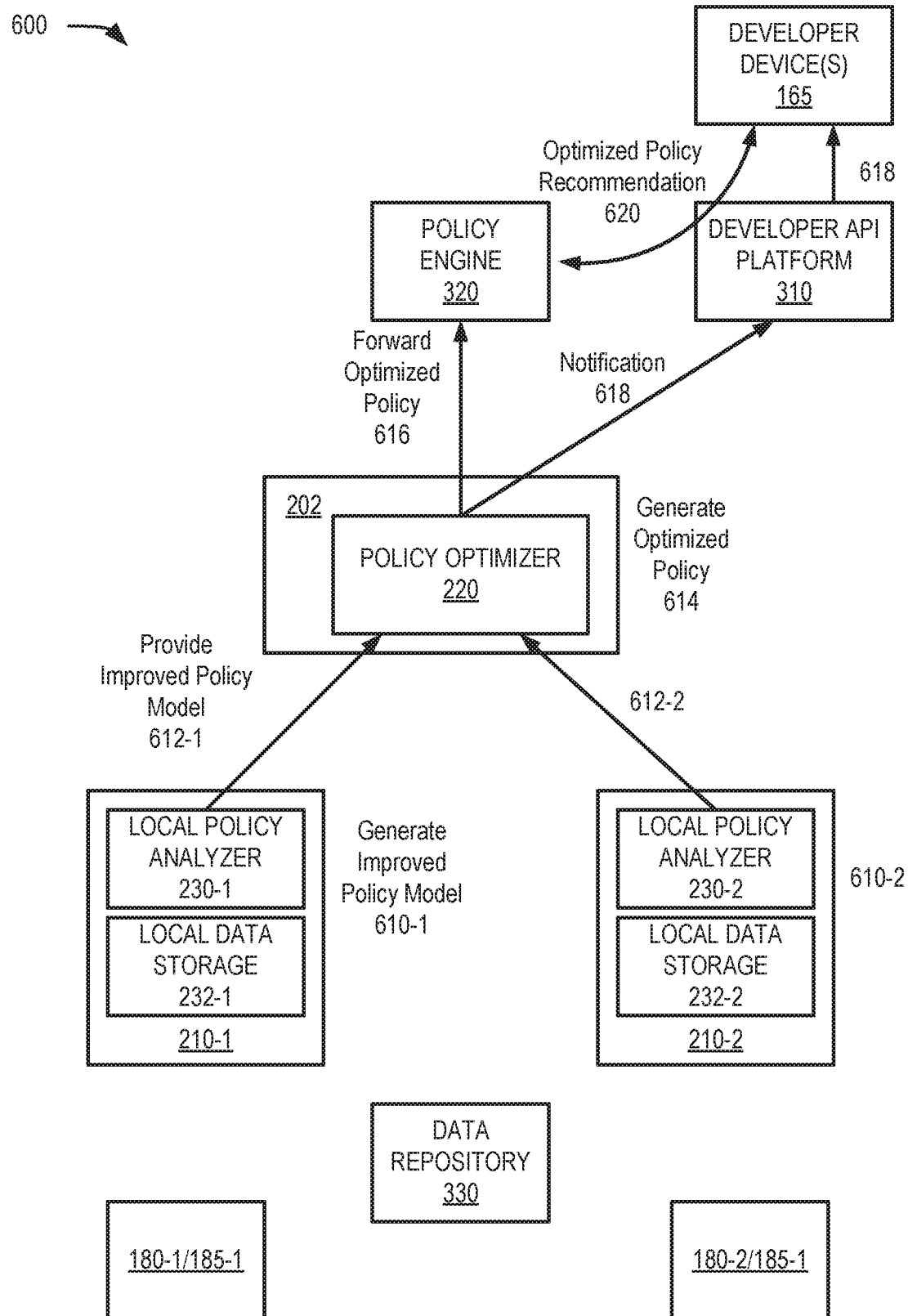

FIGS. 6A and 6B are diagrams illustrating exemplary communications for providing the MEC policy optimization service in a portion 600 of network environment 100. FIGS. 6A-6B provide simplified illustrations of communications in network portion 600 and are not intended to reflect every signal or communication exchanged between devices.

As shown in FIG. 6A, services to support application 185 may be instantiated at MEC clusters 210 using an initial policy (e.g., a policy from policy engine 320 that indicate required latency, bandwidth, etc.). Particularly, as indicated by 602-1 and 602-2, MEC clusters 210-1 and 210-2 respectively may be configured (e.g., with apps 217 of FIG. 2) to provide application services for an application 185-1, which may be executed by multiple end devices, such as 180-1 and 180-2.

User devices 180 executing application 185-1 may access MEC services from respective MEC clusters 210, as indicated by references 604-1 and 604-2. Data pertaining to access of services 604-1 (e.g., relevant to end device 180-1 and application 185-1) may be collected 606-1 and stored in local data storage 232-1. Similarly, data pertaining to access of services 604-2 (e.g., relevant to end device 180-2 and application 185-1) may be collected 606-2 and stored in local data storage 232-2.

In addition to collecting data 606, each local MEC cluster 210 may obtain additional network data 608 from, for example, data repository 330. Obtained data 608-1 for MEC cluster 210-1 may be stored in local data storage 232-1, while obtained data 608-2 for MEC cluster 210-2 may be stored in local data storage 232-2. In one implementation, obtained data 608-1 may be different than obtained data 608-2. For example, obtained data 608-1 may relate to one or more access stations 110, while obtained data 608-2 may include data for one or more different wireless stations 110. For each MEC cluster 210, respective collected data 606 may be combined with respective obtained data 608 in local data storage 232.

Referring to FIG. 6B, local policy analyzer 230-1 may retrieve data from local data storage 232-1 and apply machine learning algorithms to generate an improved policy model 610-1 that may be specific to application 185-1. For example, local policy analyzer 230-1 may determine that application 185-1 can be serviced with higher latency without disrupting user experience or that fewer dedicated service instances (e.g., apps. 217) are needed at MEC cluster 210-1 to provide the application service. According to different implementations, local policy analyzer 230-1 may analyze local data storage 232-1 periodically, upon request from policy optimizer 220, whenever MEC resources are available, or when local data storage 232-1 reaches a certain capacity threshold. Local policy analyzer 230-2 may perform a similar analysis to generate an improved policy model 610-2 and the same or different intervals.

The improved policies generated by local policy analyzer 230-1 and local policy analyzer 230-2 can be based on different data (e.g., respective to different RANs, different locations, different network resources, etc. associated with each MEC cluster 210) and may result in different models. Local policy analyzer 230-1 may provide the improved policy model 612-1 to policy optimizer 220 in orchestrator 220. Similarly, Local policy analyzer 230-2 may provide the other improved policy model 612-2 to policy optimizer 220.

Policy optimizer 220 may receive the improved policy models from local policy analyzer 230-1 and local policy analyzer 230-2. Policy optimizer 220 may apply machine learning algorithms to generate an optimized policy 614 based on the policy models from 612-1 and 612-2. The optimized policy may, for example, resolve conflicts between models, incorporate non-conflicting features from policy models, etc.

Policy optimizer 220 may forward 616 the optimized policy to policy database 320, where it may be included with other application policies for selection (e.g., for instantiation of other new applications 185). Additionally, policy optimizer 220 may provide a notification 618 to indicate to a user (e.g., a developer of application 185-1) that an optimized policy is available. In one implementation, the notification 618 may be provided to a user of developer device 165 via developer API platform 310. The user may then access developer API platform 310 to view, edit, and/or select the optimized policy recommendation for application 185-1.

Figure 7:
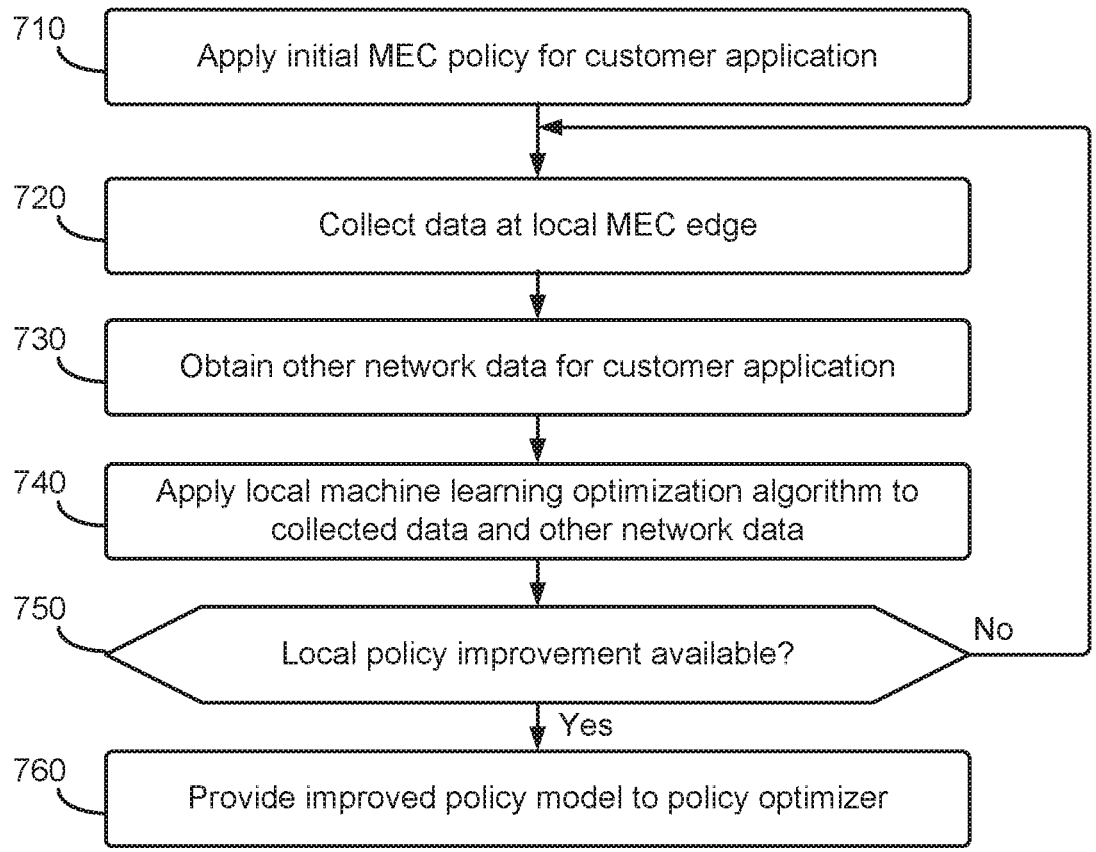
FIGS. 7 and 8 are flow diagrams illustrating exemplary processes for providing a MEC policy optimization service, according to an implementation described herein.

FIG. 7 is a flow diagram illustrating an exemplary process 700 for generating a model for an MEC policy optimization service. In one implementation, process 700 may be performed by local policy analyzer 230. In another implementation, process 700 may be performed by local policy analyzer 230 in conjunction with one or more other network devices in network environment 100.

Process 700 may include applying an initial MEC policy for an application (block 710) and collecting data at a local MEC edge (block 720). For example, based on developer input, MEC clusters 210-1 and 210-2, respectively, may be configured to provide application services for an application 185-1, which may be executed by multiple end devices, such as 180-1 and 180-2. After the initial policy is implemented for a customer application, local policy analyzer 230 may collect local MEC performance data, including data associated with servicing the customer application.

Process 700 may further include obtaining other network data for the application (block 730), applying a local machine learning optimization algorithm to the collected data and other network data (block 740), and determining if a local policy improvement is available (block 750). For example, local policy analyzer 230 may also obtain data from local data storage 232, such as analytics information associated with access network 105 and/or provider network 130. Local policy analyzer 230 may apply a machine learning system to identify, based on the network performance data, an improved policy to optimize the initial policy for the customer application If a local policy improvement is not available (block 750—No), process 700 may return to process block 720 collect additional data. If a local policy improvement is available (block 750—Yes), process 700 may further include providing an improved policy model to a policy optimizer (block 760). For example, local policy analyzer 230 may generate an updated/improved policy model for the customer application with respect to application services from the corresponding MEC cluster 210. Local policy analyzer 230 may send the improved policy model to policy optimizer 220.

Figure 8:
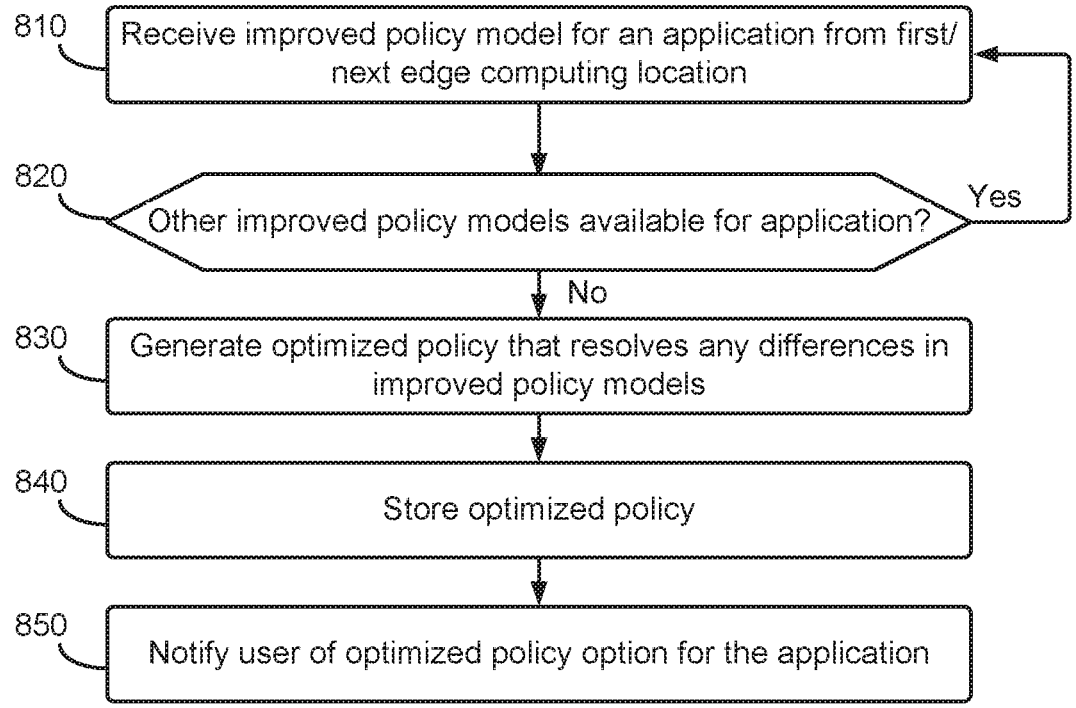

FIG. 8 is a flow diagram illustrating an exemplary process 800 for implementing a MEC policy optimization service. In one implementation, process 800 may be performed by policy optimizer 220. In another implementation, process 800 may be performed by policy optimizer 220 in conjunction with one or more local policy analyzers 230 or other network devices in network environment 100.

Process 800 may include receiving an improved policy model for an application from a first edge computing location (block 810) and determining if other improved policy models are available for the application (block 820). For example, policy optimizer 220 may receive policy models for a particular application from each MEC cluster 210, or as many MEC clusters 210 for which the customer application uses the application services.

If other improved policy models are available for the application (block 820—Yes), process 800 may return to process block 810 to receive an improved policy model for the application from a next edge computing location. If other improved policy models are not available for the application (block 820—No), process 800 may include generating an optimized policy that resolves differences in the improved policy models (block 830). For example, policy optimizer 220 may receive different policy models (e.g., for the same customer application) from two or more local policy analyzers 230. Policy optimizer 220 may resolve conflicts between the different models and incorporate non-conflicting features from policy models to generate an optimized policy for the MEC application service as applied to the customer application.

Process 800 may further include storing the optimized policy (block 840) and notifying a user of the optimized policy option for the application (block 850). For example, policy optimizer 220 may store the optimized policy in a local memory and/or in policy engine 320. Additionally, policy optimizer 220 may send to a customer a notification of the availability of an optimized policy for the customer application.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 7-8, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 520, etc.), or a combination of hardware and software (e.g., software 535).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 520) of a device. A non-transitory storage medium includes one or more of the storage mediums described in relation to memory 530.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method, comprising:
    soliciting, via a developer platform, developer input for an initial policy for a Multi-access Edge Computer (MEC) application service supporting a customer application;
    instantiating, at multiple MEC clusters in different geographic locations, the MEC application service with the initial policy;
    storing, at a first edge cluster of the multiple MEC clusters, a first local policy analyzer and first tracked performance data related to execution of the MEC application service at the first edge cluster;
    storing, at a second edge cluster of the multiple MEC clusters, a second local policy analyzer and second tracked performance data related to execution of the MEC application service at the second edge cluster;
    generating, by the first local policy analyzer in the first edge cluster and based on the first tracked performance data, a first model of an improved policy, wherein the first model alters the initial policy;
    generating, by the second local policy analyzer in the second edge cluster and based on the second tracked performance data, a second model of the improved policy, wherein the second model alters the initial policy differently than the first model; and
    generating, by a central network device, the improved policy for the customer application based on the first model and the second model.

2. The method of claim 1, wherein generating the first model of the improved policy includes maintaining performance metrics for the customer application while modifying the first policy with:
    an increased a latency requirement,
    a decreased a minimum number of service instances dedicated to the customer application; or
    a reduced required throughput by the MEC application service.

3. The method of claim 1, wherein generating the first model of the improved policy comprises applying machine learning to the first tracked performance data and performance metrics for the customer application.

4. The method of claim 1, wherein the first model of the improved policy includes one or more of a minimum latency requirement, a minimum number of service instances dedicated to the customer application, a memory reservation, or required throughput.

5. The method of claim 1, wherein the first tracked performance data includes first edge cluster performance data for the MEC application service.

6. The method of claim 1, wherein the first tracked performance data includes one or more of an access network performance data, a core network performance data, or customer application performance data.

7. The method of claim 1, wherein the first tracked performance data includes location data or security data.

8. The method of claim 1, further comprising:
    receiving, by the central network device, the first model of the improved policy and the second model of the improved policy, wherein generating the improved policy for the customer application comprises resolving conflicts between the first model and the second model.

9. The method of claim 1, further comprising:
    sending, to the customer, a notification of the improved policy for the customer application.

10. The method of claim 8, further comprising:
    storing the improved policy in a memory.

11. A system, comprising:
    a developer platform configured to solicit developer input for an initial policy for a Multi-access Edge Computer (MEC) application service supporting a customer application;
    an orchestrator device configured to instantiate, at multiple MEC clusters in different geographic locations, the MEC application service with the initial policy;
    a first edge cluster of the multiple MEC clusters, including a first processor configured to:
        store a first local policy analyzer and first tracked performance data related to execution of the MEC application service at the first edge cluster, and generate, based on the first tracked performance data, a first model of an improved policy, wherein the first model alters the initial policy;
a second edge cluster of the multiple MEC clusters, including a second processor configured to:
store a second local policy analyzer and second tracked performance data related to execution of the MEC application service at the second edge cluster, and
generate, based on the second tracked performance data, a second model of the improved policy, wherein the second model alters the initial policy differently than the first model; and
a network device including a third processor configured to:
generate the improved policy for the customer application based on the first model and the second model.

12. The system of claim 11, wherein, when generating the first model of the improved policy, the first processor is further configured to:
apply machine learning to the first tracked performance data.

13. The system of claim 11, wherein the first model of the improved policy modifies the first policy by:
increasing a latency requirement,
decreasing a minimum number of service instances dedicated to the customer application; or
reducing required throughput by the MEC application service.

14. The system of claim 11, wherein, when generating the improved policy, the third processor is further configured to:
resolve conflicts between the first model and the second model.

15. The system of claim 14, wherein the third processor is further configured to:
send, to a customer, a notification of the improved policy for the customer application.

16. The system of claim 14, wherein the first processor is further configured to:
store the improved policy.

17. The system of claim 11, wherein when generating the improved policy for the customer application, the third processor is further configured to:
incorporate non-conflicting features from the first model and the second model.

18. A non-transitory computer-readable storage medium storing instructions executable by one or more processors of one or more devices, which when executed cause the one or more processors to:
solicit, via a developer platform, developer input for an initial policy for a Multi-access Edge Computer (MEC) application service supporting a customer application;
instantiate, at multiple MEC clusters in different geographic locations, the MEC application service with the initial policy;
store, at a first edge cluster of the multiple MEC clusters, a first local policy analyzer and first tracked performance data related to execution of the MEC application service at the first edge cluster;
store, at a second edge cluster of the multiple MEC clusters, a second local policy analyzer and second tracked performance data related to execution of the MEC application service at the second edge cluster;
generate, by the first local policy analyzer in the first edge cluster and based on the first tracked performance data, a first model of an improved policy, wherein the first model alters the initial policy;
generate, by the second local policy analyzer in the second edge cluster and based on the second tracked performance data, a second model of the improved policy, wherein the second model alters the initial policy differently than the first model; and
generate the improved policy for the customer application based on the first model and the second model.

19. The non-transitory computer-readable storage medium of claim 18, wherein the instructions to generate the improved policy further comprise instructions to:
resolve conflicts between the first model and the second model.

20. The non-transitory computer-readable storage medium of claim 19, further comprising instructions to:
store in a memory the improved policy.

* * * * *